United States Patent [19]

Fabrig

[11] 4,334,608

[45] Jun. 15, 1982

[54] APPARATUS FOR TRANSPORTING STACKS OF PAPER SHEETS OR THE LIKE

[75] Inventor: Paul Fabrig, Neuffen, Fed. Rep. of Germany

[73] Assignee: Womako Maschinenkonstrucktionen GmbH, Nürtingen, Fed. Rep. of Germany

[21] Appl. No.: 156,353

[22] Filed: Jun. 4, 1980

[30] Foreign Application Priority Data

Dec. 15, 1979 [DE] Fed. Rep. of Germany ....... 2950617

[51] Int. Cl.[3] ........................ B65G 47/86; B65G 25/00

[52] U.S. Cl. .................................... 198/650; 198/696; 294/104

[58] Field of Search ............... 198/486, 479, 650, 696, 198/620; 271/85, 268; 294/104; 414/20, 753; 140/92.3, 92.7

[56] References Cited

U.S. PATENT DOCUMENTS

| | | | |
|---|---|---|---|
| 4,167,966 | 7/1979 | Cutter | 198/650 |
| 4,231,466 | 11/1980 | Rather | 198/479 |
| 4,270,652 | 6/1981 | Lay et al. | 198/486 |

FOREIGN PATENT DOCUMENTS

| | | | |
|---|---|---|---|
| 1436067 | 4/1969 | Fed. Rep. of Germany | 140/92.3 |

*Primary Examiner*—Robert B. Reeves
*Assistant Examiner*—Brian Bond
*Attorney, Agent, or Firm*—Kontler, Grimes & Battersby

[57] ABSTRACT

Apparatus for transporting stacks of paper sheets in a spiral binding machine has a hollow frame with a forwardly and downwardly sloping front panel which is provided with a horizontal slot extending between a first station where fresh stacks of paper sheets are placed onto the exposed side of the panel and a second station where the stacks are subjected to one or more treatments, such as making of perforations, breaking up into smaller stacks, introduction of spiral binders, or looping of end portions of the outermost convolutions of inserted spiral binders. A tongs in the interior of the frame is mounted on a reciprocable carriage which is rigid with one jaw of the tongs and supports the other jaw through the medium of a pivotable lever which is pivotably connected with the other jaw. The carriage is reciprocable between the two stations and the lever and the other jaw have roller followers tracking cams which are movable up and down to retract the other jaw into the frame during movement of the carriage back to the first station, to move the other jaw outwardly through the slot and into engagement with a stack which overlies the one jaw at the first station, to thereupon maintain the jaws in engagement with the stack during movement of the carriage to the second station, and to open the tongs by moving the other jaw away from the one jaw upon arrival of the carriage at the second station. Springs are provided to bias the other jaw to the position of engagement with the one jaw or with a stack between the two jaws, and to bias the other jaw from the concealed position through the medium of the lever.

11 Claims, 6 Drawing Figures

APPARATUS FOR TRANSPORTING STACKS OF PAPER SHEETS OR THE LIKE

BACKGROUND OF THE INVENTION

The present invention relates to improvements in apparatus for transporting stacks of paper sheets or other commodities between spaced apart first and second stations. More particularly, the invention relates to improvements in apparatus for transporting successive commodities, either continuously or stepwise, from a first station to a second station and for returning the transporting instrumentalities to the first station, upon delivery of a commodity to the second station, so as to enable the instrumentalities to engage and entrain the next commodity.

Apparatus of the above outlined character can be used with advantage in machines for the processing of stacked paper sheets, e.g., in so-called spiral binding machines wherein successive stacks of preperforated paper sheets or stacks which are perforated in the machine proper are provided with spiral binders to form therewith steno pads, exercise books, calendars or analogous stationery products. In many instances, transporting apparatus for stacks of paper sheets or the like comprise tongs with jaws which engage a stack at the preceding station and open upon completion of movement to the next-following station so as to allow for removal of the stack or for other treatment of such stack at the next-following station. The tongs is movable back and forth between two stations and the jaws are arranged to close at the preceding station and to open at the next-following station. The utilization of transporting apparatus which include tongs is advisable in machines wherein stacked paper sheets, panels, foils or the like must be transported and located with a high degree of accuracy. The same holds true if the stacks of paper sheets or the like must be subjected to one or more treatments during transport between a preceding and a next-following station. For example, preparation of stacks of paper sheets for assembly with spiral binders necessitates several preliminary treatments which must be carried out with a high degree of accuracy in order to facilitate threading of the binder into the perforations which are provided along one marginal portion of the stack. In the absence of accurate alignment of neighboring sheets or shifting of certain sheets to predetermined positions, the leader of the spiral binder would encounter numerous obstacles and would be incapable of passing through all perforations of a stack.

OBJECTS AND SUMMARY OF THE INVENTION

An object of the invention is to provide a transporting apparatus for stacks of paper sheets or other commodities which is constructed and assembled in such a way that it can transport successive commodities at frequent intervals and does not interfere with the treatment of commodities at that station where the commodities are disengaged from the apparatus for further transport, for changing the orientation of their constituents, for removal of material therefrom, and/or for other purposes.

Another object of the invention is to provide novel and improved means for mounting and actuating the tongs of a transporting apparatus for stacked paper sheets or the like.

A further object of the invention is to provide novel and improved tongs for use in the above outlined apparatus and to provide novel and improved means for opening or closing the tongs during selected stages of movement of the tongs between a receiving station where the tongs can engage a fresh commodity and a second station where the commodity is released for further processing.

An additional object of the invention is to provide a transporting apparatus which can be installed in many existing or known machines for the processing of paper sheets or the like as a simpler, more reliable, more compact and longer-lasting substitute for heretofore known transporting apparatus.

An ancillary object of the invention is to provide the apparatus with novel and improved means for concealing its tongs whenever the tongs is not in engagement with a stack of paper sheets or another commodity.

A further object of the invention is to provide the apparatus with novel and improved means for urging certain constituents of the tongs to preselected positions.

An additional object of the invention is to provide a machine which embodies the above-outlined transporting apparatus.

The invention is embodied in an apparatus for transporting commodities, especially stacks of paper sheets, between spaced-apart first and second stations. The apparatus comprises support means (e.g., a plate-like front panel forming part of a hollow machine frame or housing) having an exposed first side and a second side and defining an elongated path which extends between the first and second stations, a tongs having first gripper means and second gripper means which is movable relative to the first gripper means, a carriage which supports the tongs and is movable along the path from the first station to the second station and back to the first station to advance to the second station a commodity which is engaged by the gripper means of the tongs at the first side of the support means during dwell of the tongs at the first station and to return to the first station after the tongs opens at the second station so that the thus advanced commodity need not share the movement of the tongs back to the first station, and means for moving the second gripper means relative to the first gripper means between a first position in which the second gripper means extends beyond the first side of the support means and cooperates with the first gripper means to engage and advance a commodity from the first to the second station and a second position in which the second gripper means is located at the second side of the support means during movement of the carriage toward the first station.

It is preferable to construct and assemble the tongs in such a way that the second gripper means is further movable to an intermediate position in which the tongs is open and the second gripper means extends beyond the first side of the support means. The moving means then includes means for moving the second gripper means through the intermediate position during movement of the second gripper means between the first and second positions.

In a presently preferred embodiment of the apparatus, the second gripper means includes a commodity-engaging portion which is located at a level above the first gripper means in the first position of the second gripper means, and the carriage is located at the second side of the support means. The moving means for the second gripper means is also located at the second side of the support means so that the first side of the support means is readily accessible for delivery of fresh stacks or other commodities at the first station and for convenient removal of commodities (or other treatment of commodities) at the second station.

The novel features which are considered as characteristic of the invention are set forth in particular in the appended claims. The improved transporting apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
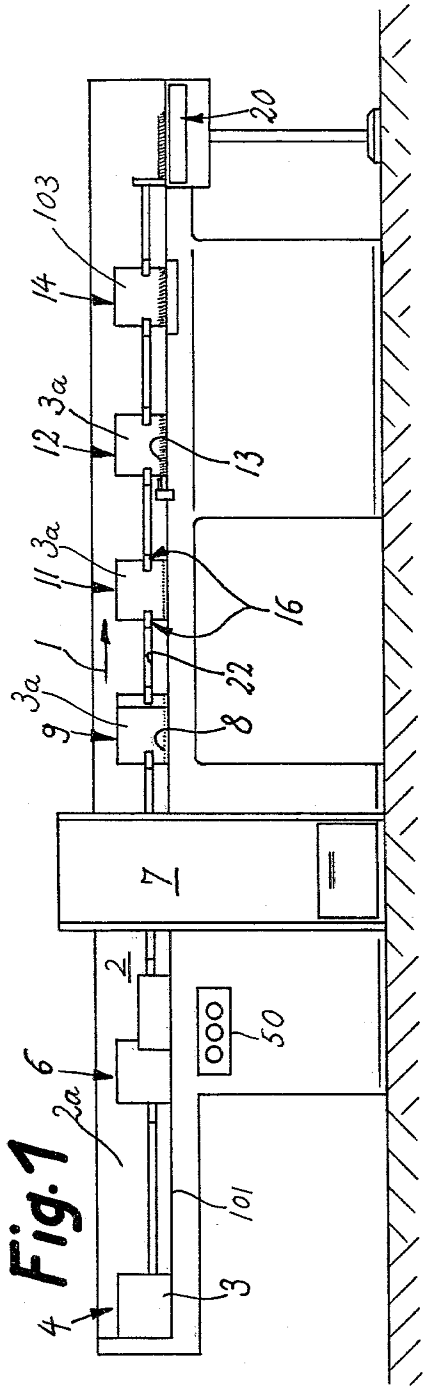
FIG. 1 is a schematic front elevational view of a spiral binding machine embodying several transporting apparatus which are constructed and assembled in accordance with the invention.

FIG. 1 illustrates a spiral binding machine wherein stacks 3 of superimposed paper sheets or the like are manipulated at several successive stations in order to convert each stack into a steno pad, a calendar, an exercise book or an analogous stationery product 103. The spiral binding machine comprises a frame or housing 21 the front side of which has a downwardly and forwardly sloping plate-like support 2 having an exposed flat outer side or surface 2*a* extending along a series of processing stations and defining an elongated path for the transport of stacks 3, 3*a* and finished articles 103 (hereinafter called pads for short) at a given distance above the floor level. The illustrated machine is or may be of the type known as 530 S manufactured and sold by the assignee of the present application. The machine is capable of processing relatively thin as well as relatively thick stacks 3, 3*a* and pads 103, e.g., stacks and pads having up to and even in excess of 250 sheets each. The direction in which the stacks 3, 3*a* and pads 103 are transported along the path which is defined by the exposed side or surface 2*a* of the support 2 is indicated by the arrow 1.

The reference character 4 denotes a receiving or first station where successive stacks 3 are deposited on the inclined surface 2*a*, either by hand or by an automatic or semiautomatic conveying mechanism (not shown), so that the lower marginal portions of the sheets which constitute a stack 3 come to rest on a ledge or stop 101 having an upper surface 101*a* (see FIG. 2) and one side of stack 3 abuts against the surface 2*a*.

The receiving station 4 is followed by a stack dividing or breaking second station 6 where the oncoming stacks are broken up into smaller stacks or piles for convenient perforation of one marginal portion of each pile. Such division of larger stacks into smaller stacks or piles is desirable and advantageous when the stacks 3 which are supplied to the receiving station 4 are relatively thick so that a single perforating unit would be incapable of forming a row of holes in the entire stack and with a requisite degree of accuracy, e.g., with a degree of accuracy which is required for rapid threading of a spiral wire binder through successive holes or perforations 8 and of the reassembled stack 3*a*. The perforating unit which serves to provide one marginal portion of each pile of a divided stack 3 with a row 8 of perforations is shown at 7. The exact details of this perforating unit form no part of the present invention; it suffices to say that the unit 7 forms perforations in each pile and the perforations of each pile form a row which is adjacent to one marginal portion of each sheet of the respective pile, namely, to the lower marginal portion which abuts against the surface 101*a* of the ledge or stop 101.

The piles of a divided stack 3 are reassembled (i.e., superimposed upon each other) to form a stack 3*a* having a lower marginal portion which is provided with the row of perforations 8 shown in FIG. 1 at a gathering station 9 which follows the stack dividing station 6 and the perforating unit 7 (as considered in the direction of the arrow 1). The gathering station 9 may be further provided with means for effecting preliminary or coarse orientation of sheets in a reassembled stack 3*a* in such a way that the perforations 8 are not straight holes in the lower marginal portions of the respective stack 3*a* but assume an arcuate shape corresponding to the curvature and/or lead of convolutions of a spiral binder 13 which is to be connected with a stack 3*a* in order to form therewith a finished stationery product 103, i.e., a pad or the like.

The gathering station 9 is followed by a second orienting station 11 where the stacks 3*a* are subjected to a final or precise orienting action of suitable instrumentalities in order to ensure that the convolutions of a spiral binder 13 will readily pass through the perforations 8. For example, the treatment at the second orienting station 11 may involve shifting of some sheets of a stack 3*a* in the direction of the arrow 1 as well as some shifting of certain sheets in a direction at right angles to that which is indicated by the arrow 1 and in parallelism with the plane of the exposed side or surface 2*a* so that the configuration of each perforation 8 of the reassembled pad 3*a* leaving the station 11 will match or closely approach that (namely, the lead and the curvature) of each convolution of a spiral binder 13.

If desired, coarse orientation at the gathering station 9 may involve shifting of some sheets of a pad 3*a* in and/or counter to the direction of the arrow 1 to thereby conform the lead of perforations 8 to that of the convolutions forming part of a spiral binder 13. The treatment at the second orienting station 11 then involves imparting to the lower edge face of the pad 3*a* a concave shape with a radius of curvature matching or approaching that of a convolution in a spiral binder 13. This ensures that a binder 13 can be rapidly threaded through the perforations 8 of a pad 3*a* when the latter reaches the spiral binder inserting station 12. The latter station follows the station 11, as viewed in the direction of arrow 1, and is followed by a deforming station 14 where the end portions of the two outermost convolutions of each spiral binder 13 are clipped and deformed so as to avoid injury to the user and/or interlacing of spiral binders forming part of neighboring pads 103. For example, the instrumentalities at the deforming station 14 may include means for looping the end portions of the outermost convolutions of a spiral binder 13 around the respective next-to-the-outermost convolutions of the same binder. Reference may be had to U.S. Pat. No. 4,095,623 granted June 20, 1978 to Lemburg et al. and describing an apparatus for looping the end portions of outermost convolutions of spiral binders for use in steno pads or the like.

The frame 21 further defines a second path 20 which makes an angle of 90 degrees with the path extending along the exposed side or surface 2a of the plate-like support 2. The pads 103 which reach the path 20 are inverted, stacked and/or otherwise processed in a manner not forming part of the present invention.

Figure 2:
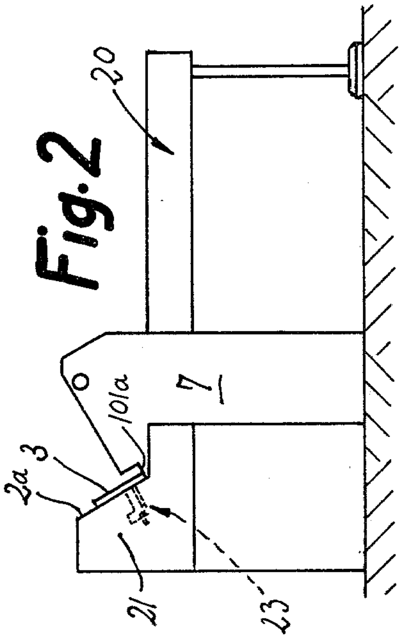
FIG. 2 is a side elevational view of the machine as seen from the left-hand side of FIG. 1.

The invention relates to a transporting apparatus which is installed between two neighboring stations of the spiral binding machine of FIGS. 1 and 2. The purpose of the apparatus is to transport stacks or pads while moving in one direction, and to travel back, without transporting any pads, to a starting position of readiness to transport the next stack or pad. The apparatus of the present invention can be used with particular advantage for transport of stacks or pads from a preceding station to the next-following station where the stacks or pads must be located or positioned with a high degree of accuracy. For example, the apparatus can be used to transport stacks 3 from the receiving station 4 to the dividing station 6 by moving successive freshly admitted stacks along the corresponding portion of the exposed side or surface 2a in the direction of the arrow 1. The stacks 3 are released upon arrival at the station 6, and the component parts of the apparatus thereupon move in a direction to the left, as viewed in FIG. 1, so as to be ready to engage and transport the next stack which is deposited on the support 2 and ledge 101 at the first station 4. However, it is clear that the apparatus can be used with equal advantage to transport stacks or pads between other stations of the machine shown in FIGS. 1 and 2, or that this machine can be equipped with two or more apparatus each of which embodies the invention.

The stacks 3 which reach the second station 6 must be released in a predetermined position in order to allow for predictable division of each stack into a preselected number of piles; this is a prerequisite for satisfactory perforation of each pile before the piles are reassembled to form a modified stack 3a wherein each perforation of each and every sheet must register with the corresponding perforations of each other sheet of the same reassembled stack.

The details of an improved apparatus which serves to transport stacks 3 or 3a or pads 103 in the spiral binding machine of FIGS. 1–2 or in another machine wherein commodities must be transported stepwise from a preceding station to a next-following station are shown in FIGS. 3 to 6. The apparatus comprises a tongs 16 which can comprise a single pair of grippers or jaws serving to engage one marginal portion of a stack 3 or 3a or a pad 103, or which comprises two mirror symmetrical pairs of jaws or grippers one of which engages a first marginal portion and the other of which engages a second marginal portion of a stack or pad during transport between two neighboring stations. FIG. 1 shows an apparatus with two tongs 16 at each of the stations 9, 11, 12 and 14. The apparatus which serves to transport stacks 3 between the stations 4 and 6 is not shown in FIG. 1; this apparatus is assumed to have a single tongs 16 of the type shown in FIGS. 3–6.

In addition to the tongs, each apparatus comprises means for shifting the tongs back and forth as well as moving means for opening and closing the tongs and for retracting one jaw of the tongs so as to conceal such jaw during transport back to the preceding station. The means for shifting the tongs 16 between the stations 4 and 6 comprises a carriage or slide 17. The frame 21 is hollow, and the carriage 17 is installed in the interior of the frame 21 behind the plate-like support 2 for the stacks 3, i.e., at that (inner) side of the support 2 which faces away from a stack resting on the exposed side or surface 2a and abutting against the surface 101a.

The tongs 16 comprises a first or lower gripper or jaw 18 which is fixedly secured to the carriage 17 in such a way that a very small portion thereof extends through an elongated opening or slot 22 in the support 2 and outwardly beyond the exposed side 2a. The tongs 16 further comprises a mobile second gripper or jaw 19 which is articulately supported by the carriage 17 for movement relative to the gripper or jaw 18.

Figure 3:
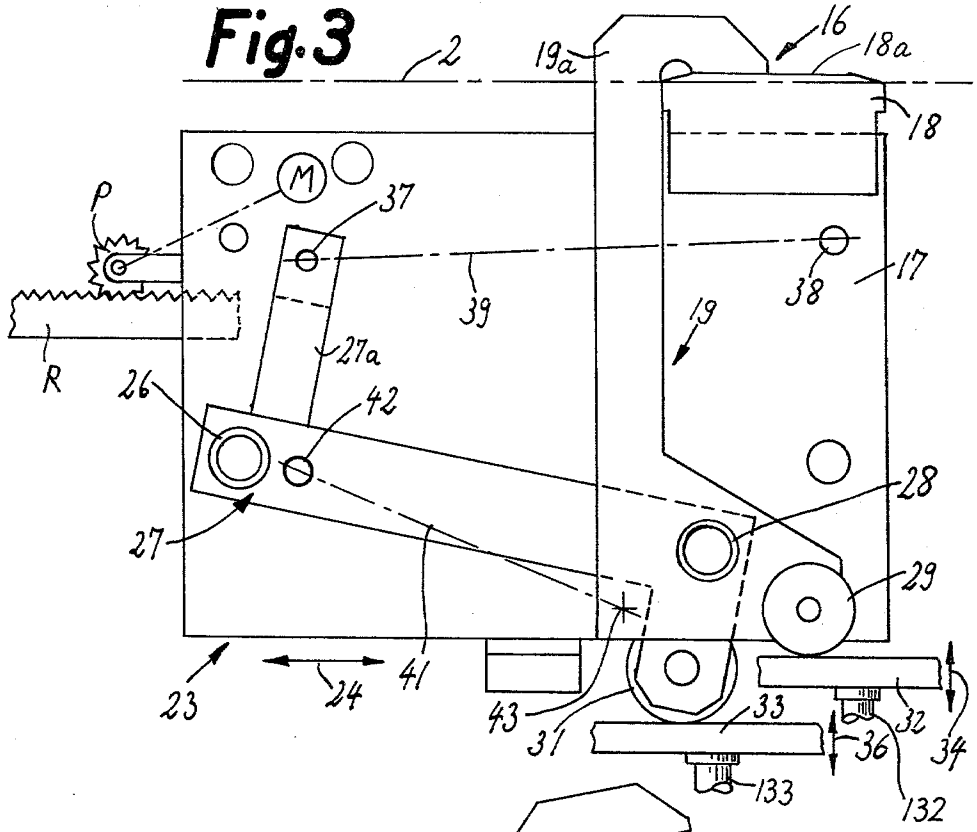
FIG. 3 is an enlarged front elevational view of a transporting apparatus which is installed in the machine of FIGS. 1 and 2 and is constructed and assembled in accordance with one embodiment of the invention, the second gripper means of the tongs being shown in the first or closed position.

The carriage 17 is movable back and forth between the stations 4 and 6 in parallelism with the slot 22 of the support 2. The means for moving the carriage 17 back and forth may comprise a pneumatic, hydraulic, electric or other motor which transmits motion to the carriage by way of a cable, a cord, a rack and pinion drive or in any other suitable way. FIG. 3 shows, very schematically, a pinion P which is rotatably mounted on the carriage 17 and meshes with a stationary rack R in the frame 21. The pinion P is driven at selected intervals by a reversible electric motor M which is mounted on the carriage 17 and causes the carriage to advance from the station 4 toward the station 6 or vice versa. It will be noted that the entire system P, R, M which moves the carriage 17 back and forth between the stations 4 and 6 is or can be confined in the interior of the hollow frame 21 so that the component parts of such system cannot interfere with deposition of fresh stacks 3 onto the exposed side 2a at the station 4 and/or with the treatment of successive stacks 3 at the dividing station 6.

Figure 4:
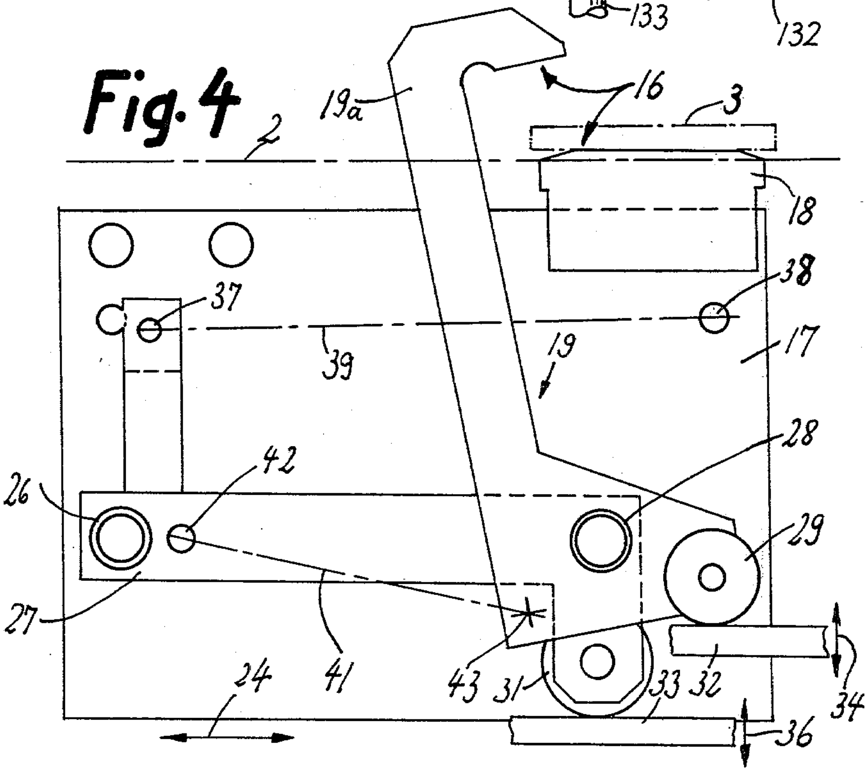
FIG. 4 is a similar enlarged front elevational view of the apparatus of FIG. 3, the second gripper means of the tongs being shown in the open or intermediate position.
Figure 5:
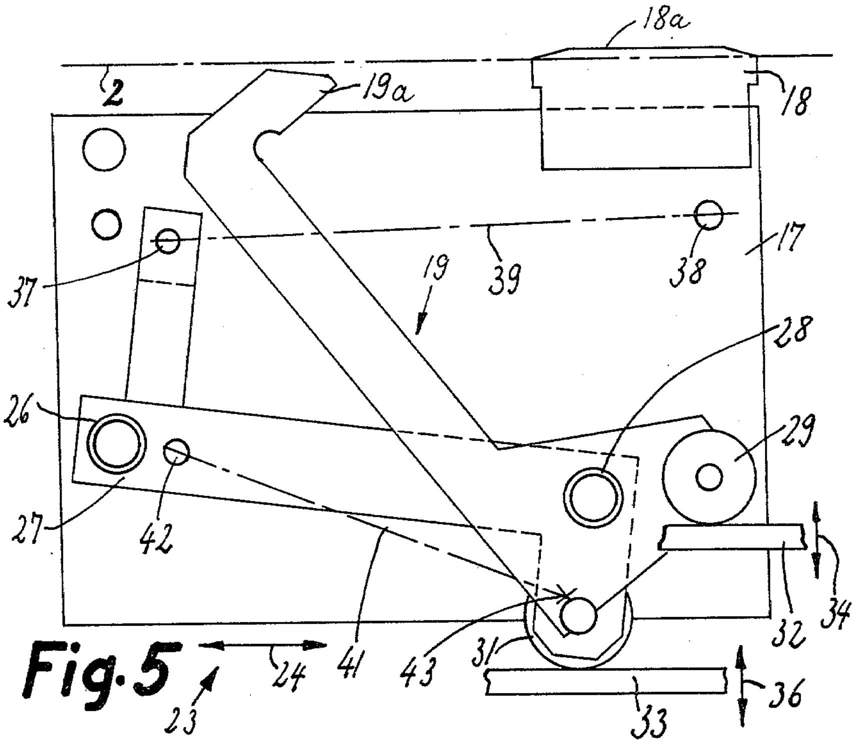
FIG. 5 is a similar enlarged front elevational view, with the second gripper means of the tongs shown in the fully concealed or second position.
Figure 6:
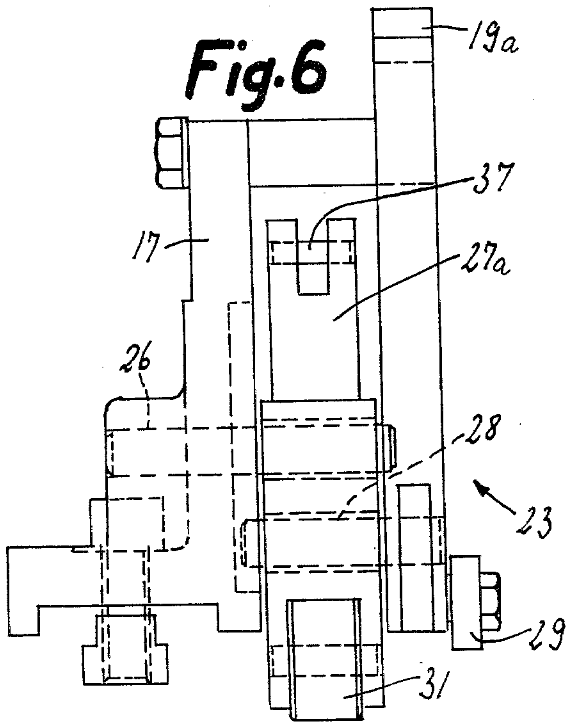
FIG. 6 is an end elevational view of the apparatus which is shown in FIGS. 3, 4 and 5.

The mobile jaw 19 can extend through the slot or channel 22 in the support 2 so as to engage the respective marginal portion of a stack 3 which is placed onto the exposed side 2a so that the just mentioned marginal portion of such stack overlies the jaw 18, namely, that portion of the jaw 18 which projects from the slot 22 or whose upper side 18a is flush with the exposed side 2a. The support 2 is indicated in FIGS. 3 to 5 by a phantom line for the sake of clarity. The jaw 19 is retractable into the frame 21 so that it can be transported back to the station 4 in fully concealed position.

The means 23 for moving the jaw 19 relative to the jaw 18 and carriage 17 comprises a lever 27 which is pivotable on a shaft 26 of the carriage 17. The latter is reciprocable in directions which are indicated by the double-headed arrow 24, i.e., the direction of reciprocatory movement of the carriage 17 (and hence the longitudinal direction of the slot 22) is normal to the axis of the shaft 26. The jaw 19 can be said to constitute a two-armed lever which is fulcrumed on a pin 28 secured to the lever 27. Thus, the jaw 19 can pivot relative to the lever 27 by turning about the axis of the pivot pin 28, and the lever 27 can pivot (with the jaw 19) relative to the carriage 17 by turning about the axis of the shaft 26. The free end portion of the lever 27 (namely, that end portion which is remote from the shaft 26) carries a roller follower 31 which can be engaged by the upper side or cam face of an elongated rail 33 installed in the interior of the frame 21 and movable up and down, as indicated by the double-headed arrow 36. The longer arm of the jaw 19 cooperates with the jaw 18 to releasably grip a stack 3 during transport from the receiving station 4 to the dividing station 6. The shorter arm of the jaw 19 carries a roller follower 29 which can be engaged by the upper side or cam face of an elongated rail 32 mounted in the interior of the frame 21 and movable up and down as indicated by the double-headed arrow 34. The means for moving the rail 32 up and down comprises a double-acting hydraulic cylinder and piston unit including a piston rod 132 which is attached to the rail 32 and a portion of which is shown in FIG. 3. The means for moving the rail 33 up and down comprises a second double-acting hydraulic or pneumatic cylinder and piston unit having a piston rod 133 a portion of which is shown in FIG. 3 and which is attached to the rail 33. The two cylinder and piston units are concealed in the interior of the frame 21.

The moving means 23 further comprises a relatively strong first helical spring 39 which is connected to a post 38 of the carriage 17 and a post 37 on an upwardly extending projection or arm **27*a* of the lever 27 so that the spring 39 tends to turn the lever 27 in a clockwise direction, as viewed in FIGS. 3, 4 or 5, in order to urge the roller follower 31 against the upper side of the rail 33. A relatively weak second helical spring 41 is connected to a post 43 of the jaw 19 and to a post 42 of the lever 27 so as to bias the jaw 19 in a clockwise direction, as viewed in FIGS. 3 to 5. Thus, the spring 41 urges the roller follower 29 against the upper side of the rail 32**.

FIG. 3 shows the tongs 16 in closed position and without a stack of paper sheets between the jaws 18 and 19. Thus, the stack-engaging portion **19*a* of the mobile jaw 19 abuts directly against the surface 18*a* of the jaw 18 which latter is affixed to the carriage 17. The position of the jaw 19 is similar when the tongs 16 transports a stack 3 from the receiving station 4 to the dividing station 6; the sole difference is that the portion 19*a* and the surface 18*a* bear against the respective sides of a marginal portion of the stack and the spring 41 stores more energy than in the position of FIG. 3 because the roller follower 29 is located at a level somewhat above that which is shown in FIG. 3. The distance between the two positions of the roller follower 29 depends on the thickness of the stack 3 between the surface 18*a* and portion 19*a*. The rails 32 and 33 are held in their lower end positions so that the spring 39 stores a minimal amount of energy, the same as the spring 41**.

The length of the rails 32 and 33 can be such that a portion of the rail 33 is located below the roller follower 31 and a portion of the rail 32 is located below the roller follower 29 in each and every position of the carriage 17. Alternatively, it may suffice to use relatively short rails 32 and 33, namely, rails which include relatively short sections at the station 4 and/or 6 so that they are engaged by the respective roller followers only when it becomes necessary to change the angular position of the lever 27 and/or jaw 19. Since the spring 41 invariably tends to maintain the jaw 19 in the position of FIG. 3 or in that position in which the portion **19*a* of the jaw 19 engages the respective marginal portion of a stack 3 between the surface 18*a* and portion 19*a*, there is no need for rails 32, 33 in the space between the stations 4 and 6. Thus, all that is necessary is to ensure that the jaw 19 can move from the raised or intermediate position of FIG. 4 toward the position of FIG. 3 when a fresh stack 3 is placed onto the surface 18*a* while the carriage 17 is located at the receiving station 4. The roller followers 29 and 31 can thereupon slide off the respective rails 32 and 33, i.e., the springs 39 and 41 take over and cause the portion 19*a* to descend toward the surface 18*a* so that a marginal portion of the freshly delivered stack 3 is properly clamped preparatory to transport toward the dividing station 6**.

When the carriage 17 reaches the dividing station 6, the rails 32 and 33 are lifted simultaneously by the respective piston rods 132 and 133 so that the lever 27 is moved to the angular position of FIG. 4 and stresses the spring 39. The jaw 19 shares the angular movement of the lever 27 with reference to the shaft 26 (in a counterclockwise direction, as viewed in FIG. 3) so that its stack-engaging portion **19*a* is lifted above and away from the stack 3 which overlies the surface 18*a*. Such lifting of the jaw 19 in response to simultaneous upward movement of the rails 32 and 33 need not result in any additional stressing of the spring 41. The tongs 16 is open and the stack 3 can remain in the position of FIG. 4 or it can be processed in any desired way including removal from the space above the surface 18*a* of the jaw 18. The motor M thereupon starts to rotate in reverse so that the pinion P rolls along the rack R and moves the carriage 17 back toward the receiving station 4. The rail 32 remains in the position which is shown in FIG. 4 (compare FIGS. 4 and 5) but the rail 33 moves downwardly so that the spring 39 is free to pivot the lever 27 in a clockwise direction, as viewed in FIG. 4, and the spring 41 turns the jaw 19 in a counterclockwise direction so that the jaw 19 is retracted into the frame 21 (see FIG. 5). The jaw 19 turns about the point or line of contact between the roller follower 29 and rail 32 (whose position remains unchanged) as well as about the axis of the pivot pin 28. Counterclockwise pivotal movement of the jaw 19 to the position of FIG. 5 is terminated when the entire jaw 19 is concealed in the frame 21, i.e., when the entire stack-engaging portion 19*a* of this jaw is located at a level below the exposed side 2*a*. The carriage 17 advances toward the station 4** and comes to a halt in a preselected end position.

When the tongs 16 is returned to the station 4, the rail 33 is lifted back to the position of FIG. 4 so that the upper portion **19*a* of the jaw 19 emerges from the slot 22. The position of the rail 32 remains unchanged during lifting of the rail 33 from the position of FIG. 5 back to the position which is shown in FIG. 4. The spring 41 dissipates energy during upward movement of the rail 33 back to the position of FIG. 4 so that it assists the lever 27 in moving the jaw 19 to the intermediate position of FIG. 4**.

The rails 32 and 33 thereupon descend as a unit from the positions of FIG. 4 to those which are shown in FIG. 3 whereby the portion **19*a* of the jaw 19 moves toward and engages the upper side of a stack 3 which has been inserted at the receiving station 4 so that it overlies the surface 18*a* of the jaw 18. The springs 39 and 41 ensure that the roller followers 29, 31 remain in contact with the respective rails 32, 33 (or that the roller follower 31 remains in engagement with the rail 33 if the rail 32 descends below and away from the roller follower 29 when the portion 19***a* engages a stack 3 on the jaw 18). The spring 41 or an analogous yieldable biasing means is desirable and advantageous because the jaws 19 and 18 can properly engage and grip relatively thin or relatively thick stacks.

The motor M is thereupon started to move the carriage 17 to the station 6 where the aforedescribed is repeated, i.e., the jaw 19 is lifted above and away from the jaw 18 to release the stack 3, and the jaw 19 is thereupon retracted into the frame 21 not later than when the carriage returns to the receiving station 4.

The station 6 can be provided with suitable clamping means (not shown) which engages a stack 3 not later than when the stack is released by the jaws 18, 19 of the tongs 16, and such clamping means can be used to change the orientation of the stack 3 at the station 6, to assist in breaking up the stack into smaller stacks or piles and/or to otherwise manipulate the freshly delivered stack. Since the jaws 18, 19 are either concealed or retracted immediately or shortly after delivery of a stack 3 of the station 6, they cannot interfere with the manipulation of such stack at the station 6. As mentioned above, all component parts of the apparatus are normally concealed in the frame 21, i.e., at a level below the exposed side 2*a*. The surface 18*a* of the jaw 18 may extend slightly beyond the exposed side 2*a*, and the portion 19*a* of the jaw 19 extends upwardly and above the exposed side 2*a* during transport of a stack 3 from the receiving station 4 to the dividing station 6.

The manner and sequence in which the motor M is started for movement in forward direction or in reverse, in which the motor M is arrested when the carriage 17 reaches the station 4 or 6, in which the motors including the piston rods 132 and 133 are started and arrested, and in which these piston rods move the respective rails or cams 32, 33 through predetermined distances forms no part of the invention. FIG. 1 shows a control panel 50 which can include knobs, pushbuttons or other actuating means for selecting the sequence in which the various motors are started and arrested as well as the length of intervals during which the respective motors are in operation or idle.

An important advantage of the improved apparatus is that the means 23 for moving the jaw 19 relative to the jaw 18 occupies little room and that such moving means is fully concealed by being installed at that side of the support 2 which faces away from a stack 3 between the jaws 18 and 19. Another important advantage of the improved apparatus is that the jaws 18 and 19 of the tongs 16 are not likely to interfere with the placing of fresh stacks 3 against the exposed side 2*a* of the support 2 at the receiving station 4 and/or with removal or other processing of stacks which arrive at the station 6. The mounting of the mobile jaw 19 on the lever 27 contributes to compactness of the moving means 23.

The cams or rails 32, 33 constitute but one of many available means for pivoting the lever 27 with the jaw 19 and for pivoting the jaw 19 relative to the lever 27. Such rails are preferred at this time because they occupy a minimum of space and can be moved up and down by relatively simple and compact motor means. Furthermore, the cams enable the jaw 19 to move its portion 19*a* at a distance from the surface 18*a* which suffices for insertion of relatively thin as well as thicker or very thick stacks or pads. As a rule, the movements of cams 32 and 33 will be selected in such a way that the jaw 19 will be moved to a predetermined open (intermediate) position irrespective of the thickness of stacks or pads. The biasing means enable the jaws 18 and 19 to properly engage and transport stacks of different thicknesses.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of my contribution to the art and, therefore, such adaptations should and are intended to be comprehended within the meaning and range of equivalence of the appended claims.

I claim:

1. Apparatus for transporting commodities, especially stacks of paper sheets, between spaced apart first and second stations, comprising support means having an exposed first side and a second side and defining an elongated path extending between the first and second stations, said support means further having an elongated opening extending between the first and second stations; a tongs having first gripper means and second gripper means movable relative to said first gripper means; a carriage supporting said tongs, located at said second side of said support means and movable along said path from the first station to the second station and back to the first station so as to advance to the second station a commodity which is engaged by said gripper means at the first side of said support means during dwell of said carriage at the first station, and to return to the first station after said tongs opens at the second station so that the thus advanced commodity need not share the movement of said tongs back to the first station, said first gripper means being affixed to said carriage; means for moving said second gripper means relative to said first gripper means between a first position in which said second gripper means extends beyond said first side of said support means and cooperates with said first gripper means to engage and advance a commodity from the first to the second station, a second position in which said second gripper means is located at said second side of said support means during movement of said carriage toward the first station and an intermediate position in which said tongs is open and said second gripper means extends beyond said first side of said support means, said moving means including means for moving said second gripper means through said intermediate position during movement of said second gripper means between said first and second positions, said second gripper means including a commodity-engaging portion which is located at a level above said first gripper means in said first position of said second gripper means and said second gripper means extending through said opening and beyond said first side of said support means in the first and intermediate positions of said second gripper means, said moving means including a lever pivoted to said carriage, means for pivotally connecting said lever with said second gripper means, means for pivoting said lever and said second gripper means relative to said carriage and means for pivoting said second gripper means relative to said lever; and means for moving the pivoting means for said lever independently of the pivoting means for said second gripper means to thereby move said second gripper means to and from said second position.

2. The apparatus of claim 1, wherein each of said pivoting means includes follower means provided on said lever and said second gripper means and cam means movable relative to said carriage to thereby pivot said lever and said second gripper means by way of the respective follower means.

3. The apparatus of claim 1, further comprising means for holding the pivoting means for said second gripper means against movement during movement of said second gripper means to and from said second position under the action of said pivoting means for said lever and through the medium of said lever.

4. The apparatus of claim 1, wherein each of said pivoting means comprises an elongated rail and means for moving said rails relative to said carriage, said lever and said second gripper means having follower means arranged to track the respective rails.

5. The apparatus of claim 1, further comprising means for yieldably biasing said second gripper means to said first position.

6. The apparatus of claim 5, wherein said biasing means comprises at least one spring which is connected between said lever and said carriage.

7. The apparatus of claim 1, further comprising means for yieldably biasing said second gripper means to said second position.

8. The apparatus of claim 1, further comprising a hollow frame including said support means, said carriage and said moving means being installed in the interior of said frame.

9. The apparatus of claim 8, wherein said exposed first side of said support means slopes downwardly and has a slot extending between said stations, said second gripper means extending through said slot and beyond said first side in the first position thereof and said second gripper means being confined in the interior of said frame in said second position thereof.

10. Apparatus for transporting commodities, especially stacks of paper sheets, between spaced apart first and second stations, comprising support means having an exposed first side and a second side and defining an elongated path extending between the first and second stations, said support means further having an elongated opening extending between the first and second stations; a tongs having first gripper means and second gripper means movable relative to said first gripper means; a carriage supporting said tongs, located at said second side of said support means and movable along said path from the first station to the second station and back to the first station so as to advance to the second station a commodity which is engaged by said gripper means at the first side of said support means during dwell of said carriage at the first station, and to return to the first station after said tongs opens at the second station so that the thus advanced commodity need not share the movement of said tongs back to the first station, said first gripper means being affixed to said carriage; means for moving said second gripper means relative to said first gripper means between a first position in which said second gripper means extends beyond said first side of said support means and cooperates with said first gripper means to engage and advance a commodity from the first to the second station, a second position in which said second gripper means is located at said second side of said support means during movement of said carriage toward the first station and an intermediate position in which said tongs is open and said second gripper means extends beyond said first side of said support means, said moving means including means for moving said second gripper means through said intermediate position during movement of said second gripper means between said first and second positions, said second gripper means including a commodity-engaging portion which is located at a level above said first gripper means in said first position of said second gripper means and said second gripper means extending through said opening and beyond said first side of said support means in the first and intermediate positions of said second gripper means, said moving means including a lever pivoted to said carriage, means for pivotally connecting said lever with said second gripper means, means for pivoting said lever and said second gripper means relative to said carriage and means for pivoting said second gripper means relative to said lever, each of said pivoting means including follower means provided on said lever and said second gripper means and cam means movable relative to said carriage to thereby pivot said lever and said second gripper means by way of the respective follower means; and means for moving said cam means up and down.

11. Apparatus for transporting commodities, especially stacks of paper sheets, between spaced apart first and second stations, comprising support means having an exposed first side and a second side and defining an elongated path extending between the first and second stations, said support means further having an elongated opening extending between the first and second stations; a tongs having first gripper means and second gripper means pivotable relative to said first gripper means; a carriage supporting said tongs, located at said second side of said support means and movable along said path from the first station to the second station and back to the first station so as to advance to the second station a commodity which is engaged by said gripper means at the first side of said support means during dwell of said carriage at said first station, and to return to the first station after said tongs opens at the second station so that the thus advanced commodity need not share the movement of said tongs back to the first station, said first gripper means being affixed to said carriage; means for moving said second gripper means relative to said first gripper means between a first position in which said second gripper means extends beyond said first side of said support means and cooperates with said first gripper means to engage and advance a commodity from the first to the second station, a second position in which said second gripper means is located at said second side of said support means during movement of said carriage toward the first station and an intermediate position in which said tongs is open and said second gripper means extends beyond said first side of said support means, said moving means including means for moving said second gripper means through said intermediate position during movement of said second gripper means between said first and second positions, said second gripper means including a commodity-engaging portion which is located at a level above said first gripper means in said first position of said second gripper means and said second gripper means extending through said opening and beyond said first side of said support means in the first and intermediate positions of said second gripper means, said moving means including a lever pivoted to said carriage, means for pivotally connecting said lever with said second gripper means, means for pivoting said lever and said second gripper means relative to said carriage and means for pivoting said second gripper means relative to said lever; and means for yieldably biasing said second gripper means to said second position, said biasing means comprising a spring connected between said lever and said second gripper means.

* * * * *